US005868820A

United States Patent [19]

Claffey

[11] Patent Number: 5,868,820

[45] Date of Patent: Feb. 9, 1999

[54] AQUEOUS COATING COMPOSITIONS AND COATED METAL SURFACES

[75] Inventor: William J. Claffey, Novelty, Ohio

[73] Assignee: PPG Industries, Inc., Pittsburgh, Pa.

[21] Appl. No.: 933,785

[22] Filed: Sep. 19, 1997

Related U.S. Application Data

[62] Division of Ser. No. 535,753, Sep. 28, 1995, Pat. No. 5,711,996.

[51] Int. Cl.[6] .............................. C23C 22/07; C09D 5/08

[52] U.S. Cl. .................................... 106/14.44; 106/14.12; 106/14.41; 106/14.42; 106/14.43; 148/259; 148/260

[58] Field of Search .................................... 148/259, 260; 106/14.12, 14.41, 14.42, 14.43, 14.44

[56] References Cited

U.S. PATENT DOCUMENTS

| | | | |
|---|---|---|---|
| 1,079,453 | 11/1913 | Swan | 148/270 |
| 1,501,425 | 7/1924 | Utendorfer | 148/274 |
| 1,798,218 | 3/1931 | Pacz | 205/320 |
| 1,817,174 | 8/1931 | Brock | 427/343 |
| 2,311,563 | 2/1943 | Mumma et al. | 101/114 |
| 2,854,368 | 9/1958 | Shreir | 148/6.15 |
| 3,547,710 | 12/1970 | Kromstein | 148/6.14 |
| 3,578,508 | 5/1971 | Pearlman | 148/6.14 |
| 3,615,895 | 10/1971 | Von Freyhold | 148/6.15 R |
| 3,944,574 | 3/1976 | Marsden et al. | 260/349 |
| 3,975,214 | 8/1976 | Kulick et al. | 148/6.15 |
| 4,003,761 | 1/1977 | Gotta et al. | 148/6.15 R |
| 4,017,335 | 4/1977 | Maloney | 148/6.15 R |
| 4,039,353 | 8/1977 | Kulick et al. | 148/6.15 R |
| 4,086,182 | 4/1978 | Hengelhaupt et al. | 252/182 |
| 4,110,129 | 8/1978 | Matsushima et al. | 148/6.15 R |
| 4,165,242 | 8/1979 | Kelly et al. | 148/6.15 Z |
| 4,174,980 | 11/1979 | Howell, Jr. et al. | 148/6.14 R |
| 4,457,790 | 7/1984 | Lindert et al. | 148/6.15 R |
| 4,539,051 | 9/1985 | Hacias | 148/6.15 Z |
| 4,643,793 | 2/1987 | Nakaso et al. | 156/306.6 |
| 4,650,526 | 3/1987 | Claffey et al. | 148/6.14 R |
| 4,656,097 | 4/1987 | Claffey et al. | 428/457 |
| 4,816,303 | 3/1989 | Kroenke et al. | 428/333 |
| 4,944,812 | 7/1990 | Lindert et al. | 148/251 |
| 4,986,977 | 1/1991 | Peters | 423/592 |
| 5,061,389 | 10/1991 | Reichgott | 252/49.3 |
| 5,112,413 | 5/1992 | Carey et al. | 148/251 |
| 5,248,525 | 9/1993 | Siebert | 427/337 |
| 5,322,713 | 6/1994 | van Ooij et al. | 427/327 |

FOREIGN PATENT DOCUMENTS

| | | | |
|---|---|---|---|
| 228151 | 7/1987 | European Pat. Off. | 148/260 |
| 2210900 | 6/1989 | United Kingdom | 148/259 |

*Primary Examiner*—Anthony Green
*Attorney, Agent, or Firm*—Kenneth J. Stachel; Ann Marie Cannoni

[57] ABSTRACT

Aqueous coating compositions are described which comprise (A) at least one cyclic hydroxy compound selected from the group consisting of cyclic polyhydroxy compounds and substituted phenols;

(B) phosphate ions;

(C) at least one oxidizer-accelerator; and (D) water.

The coating compositions also may contain fluoride ions and/or iron. A method of improving the corrosion resistance of iron, steel, and zinc-coated surfaces also is described, and the method comprises contacting the surfaces with an aqueous acidic coating composition as described above. The coated metal surfaces may be subsequently provided with an organic or inorganic top-coat or seal-coat resulting in improved corrosion resistance, adhesion and detergent resistance properties.

21 Claims, No Drawings

AQUEOUS COATING COMPOSITIONS AND COATED METAL SURFACES

This is a division of application Ser. No. 08/535,753, filed Sep. 28. 1995, now U.S. Pat. No. 5,711,996.

FIELD OF THE INVENTION

This invention relates to the art of metal surface treatment. More specifically, the present invention relates to the treatment of metal surfaces and aqueous organic coating compositions to provide more durable, adhesive and rust-inhibiting coatings. The invention also relates to the method of improving the corrosion resistance of and adhesion of siccative organic topcoats to iron, steel and zinc-coated surfaces utilizing the compositions of the invention.

BACKGROUND OF THE INVENTION

It is well known in the metal-finishing art that metal surfaces such as aluminum, ferrous and zinc surfaces may be provided with an inorganic phosphate coating by contacting the surfaces with an aqueous phosphating solution. The phosphate coating protects the metal surface to a limited extent against corrosion and serves primarily as a base for the later application of a siccative organic coating composition such as paint, lacquer, varnish, primer, synthetic resin, enamel, and the like. Procedures also have been described in the art for improving the rust-resistance of metal articles by the application of a film of paint over phosphated surfaces. Although the application of a siccative coating over a phosphated metal surface improves the corrosion resistance and adhesive properties of the metal to the topcoat, there continues to be a need to improve the corrosion resistance of and siccative organic coating adhesion to metal surfaces.

The inorganic phosphate coatings generally are formed on a metal surface by means of an aqueous solution which contains phosphate ion and, optionally, certain auxiliary ions including metallic ions such as iron, sodium, manganese, zinc, cadmium, copper, lead, calcium-zinc, cobalt, nickel, and antimony ions. These aqueous solutions also may contain non-metallic ions such as halide ions, nitrate ions, sulfate ions and borate ions. Recent advances in the pretreatment field have been limited to coatings derived from solutions containing a minimum of three metal cations such as zinc, cobalt, nickel, manganese, magnesium or calcium.

Although the adhesion of siccative organic coatings to a metal surface is improved by phosphate coatings, it has been noted, for example, where ferrous metal, galvanized ferrous metal or phosphated ferrous metal parts are provided with a siccative top-coat of lacquer or enamel and such top-coat is scratched or scored during, for example, handling, forming or assembling operations, the metal substrate becomes a focal point for corrosion and for a phenomenon known as "undercutting." Undercutting, or the loosening of the top-coat in areas adjacent to a scratch or score causes a progressive flaking of the top-coat from the affected area. In severe cases, the undercutting may extend an inch or more from each side of the scratch or score, causing a loosening and subsequent flaking of the top-coat from a substantial portion, if not all, of the metal article. The undercutting also results in a reduction of the desirable corrosion-resistance properties.

The use of inorganic phosphate coatings to prevent corrosion and improve the adhesion of paints to the metal surfaces requires, as noted above, coating solutions which contain heavy metals such as nickel, zinc, chrome, manganese, magnesium, calcium, tin, cobalt, etc. Thus, it would be desirable to treat metal surfaces to improve corrosion and paint adhesion wherein the coating applied to the metal surface does not contain such heavy metals.

Solutions containing tannins have been suggested for derusting and/or producing protective coatings on steel. For example, U.S. Pat. No. 2,854,368 describes a solution for forming protective coatings on metals which comprises 1 to 8 moles of phosphoric acid and at least one tannin material in a proportion of between 1 and 35% by weight based on the weight of the solution. U.S. Pat. No. 4,944,812 describes an aqueous metal-treating solution which comprises the condensation reaction product of a vegetable tannin, an aldehyde and an amine. The solution is reported to improve the corrosion-resistance of metals which have been treated with the composition. U.S. Pat. No. 3,547,710 describes a coating composition for ferrous metal surfaces which comprises a dilute aqueous crude extract of red cedar wood containing plicatic acid and the cedar polyphenols. When such solutions are applied to ferrous metals, a coating is deposited which imparts corrosion-resistance to the ferrous metal and also enhances the adhesion between the metal surface and a paint subsequently applied thereto.

U.S. Pat. No. 3,975,214 describes a tannin containing post-treatment composition for use over zinc phosphate conversion coatings on metallic surfaces to provide an improved base for paint, lacquer, varnishes, etc. The tannin-containing solutions described in this patent are aqueous chromium-free solutions consisting essentially of a vegetable tannin in a concentration of 0.1 to 10 g/l and having a pH of less than 6, preferably between 3 and 6.

SUMMARY OF THE INVENTION

Aqueous coating compositions are described which comprise (A) at least one cyclic hydroxy compound selected from the group consisting of cyclic polyhydroxy compounds and substituted phenols;

(B) phosphate ions;

(C) at least one oxidizer-accelerator; and (D) water.

The coating compositions also may contain fluoride ions and/or iron. A method of improving the corrosion resistance of iron, steel, and zinc-coated surfaces also is described, and the method comprises contacting the surfaces with an aqueous acidic coating composition as described above. The coated metal surfaces may be subsequently provided with an organic or inorganic top-coat or seal-coat resulting in improved corrosion resistance, adhesion and detergent resistance properties.

DESCRIPTION OF THE PREFERRED EMBODIMENTS

The aqueous coating compositions and the process of this invention can be utilized to improve the corrosion-inhibiting properties of metal surfaces such as iron, steel and zinc-coated surfaces. The coatings deposited by the compositions of the present invention which are organic at their top surface can be utilized to replace non-reactive inorganic metal treatments such as iron phosphate, zinc phosphate and chromium conversion coatings.

The resulting invention produces a coating with the corrosion resistance equal to or better than zinc phosphates and adhesion properties equal to or better than iron phosphates on iron, steel, and zinc-coated surfaces. There is a particularly strong synergistic effect when the cyclic hydroxy compound (A) above is a mixture of tannins and (C) is meta-nitro benzene sulfonate. Corrosion resistance is much better than that observed for conventional phosphate treatments.

In one embodiment, the aqueous coating compositions of the present invention comprise (A) at least one cyclic hydroxy compound selected from the group consisting of cyclic polyhydroxy compounds and substituted phenols;

(B) phosphate ions;

(C) at least one oxidizer-accelerator; and (D) water.

As noted above, one of the essential ingredients of the coating composition is at least one cyclic hydroxy compound which may be selected from the group consisting of cyclic polyhydroxy compounds and substituted phenols. A variety of cyclic hydroxy compounds can be utilized in the present invention and these include phenolic compounds such as catechol, methylene-bridged poly(alkylphenols), coumaryl alcohol, coniferyl alcohol, sinapyl alcohol, lignin and tannic acid, or non-phenolic compounds such as ascorbic acid, hydroxy alkyl celluloses such as hydroxy methyl cellulose, hydroxy ethyl cellulose and hydroxy propyl cellulose, and heterocyclic nitrogen containing compounds also containing polyhyoroxy fuctionality such as glycoluril-formaldehyde amino resin having the general structure

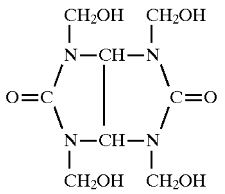

In the cyclic hydroxy compounds (A), at least one hydroxy group is attached directly to a ring and another hydroxy group may be on an aliphatic group (e.g., —$CH_2OH$) attached to the ring. Tannin or tannic acid is a polyphenolic substance which is a preferred example of the cyclic polyhydroxy compounds which are useful in the aqueous coating compositions of the present invention. Tannins are polyphenolic compounds which are extracted from various plants and trees which can be classified according to their chemical properties as (a) hydrolyzable tannins; (b) condensed tannins; and (c) mixed tannins containing both hydrolyzable and condensed tannins. Preferred tannin materials useful in the present invention are those that contain a tannin extract from naturally occurring plants and trees, and are normally referred to as vegetable tannins. Suitable vegetable tannins include the crude, ordinary or hot-water-soluble condensed, vegetable tannins. Quebracho and mimosa are preferred condensed vegetable tannins. Other vegetable tannins include mangrove, spruce, hemlock, gabien, wattles, catechu, uranday, tea, larch, myrobalan, chestnut wood, divi-divi, valonia, summac, chinchona, oak, etc. These vegetable tannins are not pure chemical compounds with known structures, but rather contain numerous components including phenolic moieties such as catechol, pyrogallol, etc., condensed into a complicated polymeric structure.

The cyclic hydroxy compounds utilized in the coating compositions of the present invention also may be substituted phenolic compounds containing only one hydroxyl group. The substituents on the phenolic compounds may be alkyl, hydroxyalkyl, or alkoxy groups containing from 1 to about 6 or more carbon atoms. Specific examples of alkyl groups include methyl, ethyl, propyl, isopropyl, n-butyl, sec-butyl, tert-butyl, amyl, etc. Examples of alkoxy groups include methoxy, ethoxy, propoxy, etc. In one preferred embodiment, the phenolic compounds will be substituted with two or more alkyl or alkoxy groups. Examples of substituted phenols useful in the coating compositions of the present invention include 4-hydroxybenzyl alcohol, 2,6-dimethylphenol, 2,6-di-tert-butylphenol, 2,6-di-t-butyl-p-cresol, etc.

The aqueous compositions of the present invention generally will contain from about 0.01 to about 1 or 1.5% by weight of the cyclic polyhydroxy compound (A) described above. In another embodiment, the aqueous coating composition will contain at least about 0.03% by weight of the tannic acid.

The aqueous coating compositions of the present invention also contain phosphate ions. In one embodiment, the coating compositions will contain from about 0.01 to about 3% by weight of phosphate ions. The source of the phosphate ions in the aqueous coating compositions of the present invention is generally phosphoric acid such as 75% phosphoric acid.

An alkali metal hydroxide such as sodium hydroxide or potassium hydroxide may be added to the aqueous coating composition of the present invention in an amount sufficient to convert the phosphoric acid to an alkali metal phosphate such as sodium phosphate or potassium phosphate. Additionally, an amine hydroxide (ammonium hydroxide) may be added to convert phosphoric acid to ammonium phosphate. Other phosphate sources include sodium acid pyrophosphate, potassium acid pyrophosphate, polyphosphates and combinations thereof.

The aqueous coating compositions also contain at least one oxidizer-accelerator which increases the rate of deposition of the coating. The oxidizer-accelerators useful in the present invention may be inorganic or organic accelerators. Examples of inorganic oxidizer-accelerators include alkali metal and ammonium chlorates, bromates, perchlorates, chlorites, nitrates, nitrites, molybdates, perborates, or mixtures thereof. Dilute solutions of hydrogen peroxide also are effective as oxidizers-accelerators in the coating compositions. Alternatively, high volume air sparging of the coating composition, is effective as an oxidizer-accellerator when the composition is in contact with the metal surface. Examples of organic oxidizer-accelerators include nitroguanidine, halo- or nitro-substituted benzene sulfonic acids and the alkali metal and ammonium salts of said sulfonic acids. Alkali metal salts of nitro-substituted benzene sulfonic acids, and more particularly, meta-nitrobenzene sulfonic acid are particularly useful oxidizer-accelerators, particularly in combination with one or more of the inorganic accelerators such as the alkali metal chlorates and nitrates. Thus, a particularly useful oxidizer-accelerator comprises the mixture of at least one alkali metal chlorate or nitrate and sodium meta-nitrobenzene sulfonate. The amount of oxidizer-accelerator included in the coating compositions may vary over a wide range. Generally, the coating compositions will contain from about 0.01 to about 3% by weight of at least one oxidizer-accelerator although amounts of up to about 1.5% by weight provides satisfactory results.

In addition to the cyclic hydroxy compound (A), the phosphate ions (B), the oxidizer-accelerator (C) and water, the aqueous coating compositions may also contain ferrous or ferric ions in amounts of up to about 250 to 2000 ppm. When the aqueous coating compositions of the present invention are to be utilized to coat non-ferrous surfaces such as zinc-coated surfaces, ferrous or ferric ions are added to the coating composition. Water-soluble forms of iron can be utilized as a source of the ferrous or ferric ions, and such compounds include ferrous phosphate, ferrous nitrate, ferrous sulfate, etc. When the surface to be coated is an iron surface, it may not be necessary to add any or as much ferrous or ferric ions since a portion of the iron surface is dissolved into the coating composition upon contact.

In another embodiment, the coating compositions of the present invention will contain fluoride ion in amounts of up to about 0.3% by weight. Fluoride ion concentrations in the range of from about 0.01 to about 1% by weight, and more often from about 0.03 to about 0.3% by weight can be included in the aqueous coating compositions of the invention. Water-soluble fluoride compounds can be utilized to introduce the fluoride ion into the coating compositions. Suitable fluoride compounds include alkali metal fluorides such as sodium fluoride, ammonium fluoride salts such as ammonium fluoride and ammonium bifluoride, other inorganic fluoride salts such as sodium silicofluoride, ammonium silicofluoride, hydrofluoric acid, hydrofluorosilicic acid and fluoboric acid.

The aqueous coating compositions of the present invention generally are utilized at a pH of between about 3.5 to 5.0 and more often, at a pH range of from about 4 to about 4.5. The pH of the solution can be adjusted by the addition to the mixture of the first part described below of an alkali such as sodium hydroxide, potassium hydroxide or sodium carbonate to increase the pH, or an acid such as phosphoric acid to reduce the pH of the composition.

The aqueous coating compositions of the present invention may be prepared by blending the various components described above in water. In one preferred embodiment, the coating compositions are prepared from a two-part system wherein each part is separately prepared and subsequently blended into additional water. Generally, the mixture of the first part will contain water, phosphoric acid, sodium hydroxide, one or more oxidizer-accelerators and optionally, ammonium bifluoride. The second part or mixture comprises water, an oxidizer-accelerator, and the cyclic hydroxy compound(s). The two parts are then blended into water at desired concentrations, and the pH is adjusted with either sodium hydroxide or phosphoric acid to the desired pH of from 3.5 to 5.0.

The following examples demonstrate the preparation of a coating composition in accordance with the present invention. Unless otherwise indicated in the example and elsewhere in the specification and claims, all parts and percentages are by weight, temperatures are in degrees Centigrade, and pressures are at or near atmospheric pressure.

EXAMPLE 1

A reactive organic conversion coating bath is made up on a per liter basis using 18 g phosphoric acid, 4 g NaOH, 7 g $NaClO_3$, 0.7 g ammonium bifluoride, and 3 g of mixed tannins (equal parts of quebracho and mimosa tannic acids. Steel panels were coated at 50° C. for 60 sec spray time. A second set of steel panels was coated with a conventional chlorate accellerated iron phosphate under the same conditions. Both sets were painted with a solvent based alkyd white paint, cured, scribed and placed into salt fog corrosion testing per ASTM B-117. The 72 hour results were;

| | |
|---|---|
| standard iron phosphate | 7 mm loss |
| reactive organic coating | 1 mm loss |

The loss refers to paint loss from scribe after taping.

EXAMPLE 2

G-90 galvanized panels were cleaned and coated with the reactive organic coating solution described in Example 1. Following this application the panels were subsequently coated with a 0.1% aqueous solution 3-aminopropyltriethoxy silane for 15 seconds at 25° C. These panels were hot air dried, electrostatically powder coated with ferro VP-255 powder and cured. No adhesion loss occurred from the scribe at 860 hour salt fog testing.

EXAMPLE 3

A reactive organic coating bath is made up as in Example 1 except that the $NaClO_3$ is replaced with 7 g of sodium meta nitrobenzenesulfonate. Steel panels were again coated as described in Example 1 with no final seal. These panels were compared to iron phosphate panels with non-chrome final seal after painting with a solvent based white alkyd paint and curing. The results of salt fog testing at 192 hours were;

standard iron/non-chrome 6 mm loss reactive organic coating no loss

The aqueous coating compositions of the present invention can be applied to the metal surfaces using various techniques known in the art including immersion, flooding, spraying, brushing, roller-coating, flow-coating, etc. Generally, it is preferred that the aqueous coating compositions be maintained at a temperature of from about 20° C. to about 80° C. while the composition is in contact with the metal surface. Contact times of from about 5 seconds to about 5 minutes provide satisfactory coatings. More often, the temperature of the coating composition is maintained at about 50°–70° C., and contact times of from about 1 to about 3 minutes are utilized.

The concentration of the coating composition and the contact time should be sufficient to provide a coating thickness or weight which is sufficient to provide the desired corrosion resistance and adhesion of subsequently applied coatings. Generally thin coatings of about 50 to about 300 nanometers thickness and coating weights of from about 30 to about 60 $mg/ft^2$ are employed. The coatings deposited by the coating compositions of the invention have a pleasing optical appearance that ranges from a uniform blue to purple on cold roll steel and a faint gray on zinc coated metals.

After the desired contact between the surfaces to be treated and the aqueous coating compositions of the present invention has been effected for the desired period of time, the coated article preferably is rinsed, optionally, with water. As with the application of the coating composition, various contacting techniques may be used with rinsing by dipping or spraying being preferred.

In addition to or in place of the water rinse, the coated metal articles can be contacted with compounds containing nitrogen, silicon, chromium, titanium, zirconium or hafnium, or polymeric resins, or combinations thereof, to provide a second coating which improves the corrosion resistance of the coated metal surface and improves the utility of the first coating as a base for the application of siccative organic coatings.

In one embodiment, the metal surfaces which have been provided with the first coating as described above are subsequently contacted with one or more water-soluble organic amines or polyamines to provide a second coating or a seal coat. Suitable amines and polyamines include those containing a nitrogen capable of hydrogen bonding with an OH group. Suitable amines include ethanolamine, diethanolamine, triethanolamine, ethylenediamine, propylenediamine, tetraethylenepentamine, dimethylaminopropylamine, di-(3-hydroxypropyl)amine, 3-hydroxybutylamine, 4-hydroxybutylamine, etc.

In another embodiment, the metal surfaces which have been provided with a first coating in accordance with the present invention, may be subsequently contacted with a silane.

In one embodiment, the silane compounds are characterized by the formula $$A_{(4-x)}Si(B)_x \qquad (I)$$

wherein A is a hydrolyzable group, x is 1, 2 or 3, and B is a monovalent organic group. The A groups are groups which hydrolyze in the presence of water and may include acetoxy groups, alkoxy groups containing up to 20 carbon atoms and chloro groups. In one preferred embodiment, x=1 and each A is an RO group such as represented by the formula $$(RO)_3SiB \qquad (IA)$$

wherein each R is independently an alkyl, aryl, aralkyl or cycloalkyl group containing less than 20 carbon atoms, more often up to about 5 carbon atoms. The number of hydrolyzable groups A present in the silane coupling agent of Formula III may be 1, 2 or 3 and is preferably 3 (i.e., x=1). Specific examples of RO groups include methoxy, ethoxy, propoxy, methylmethoxy, ethylmethoxy, phenoxy, etc.

The Group B in Formula I may be an alkyl or aryl group, or a functional group represented by the formula $$C_nH_{2n}X$$

wherein n is from 0 to 20 and X is selected from the group consisting of amino, amido, hydroxy, alkoxy, halo, mercapto, carboxy, acyl, vinyl, allyl, styryl, epoxy, isocyanato, glycidoxy and acryloxy groups. The alkyl and aryl groups may contain up to about 10 carbon atoms. Alkyl groups containing from 1 to about 5 carbon atoms are particularly useful. In one embodiment, n is an integer from 0 to 10 and more often from 1 to about 5.

The amino groups may contain one or more nitrogen atoms and, thus, may be monoamino groups, diamino groups, triamino groups, etc. General examples of diamino silanes can be represented by the formula $$A_3SiR^4N(R^5)R^4N(R^5)_2 \qquad (IC)$$

wherein A is as defined in Formula I, each $R^4$ is independently a divalent hydrocarbyl group containing from 1 to about 5 carbon atoms, and each $R^5$ is independently hydrogen or an alkyl or an aryl group containing up to about 10 carbon atoms. The divalent hydrocarbyl groups include methylene, ethylene, propylene, etc. Each $R^5$ is preferably hydrogen or a methyl or ethyl group.

The silanes which may contain amido groups include compositions represented by Formula I wherein the Group B may be represented by the formulae $$-R^4C(O)N(R^5)_2$$

and $$-R^4-N(R^5)C(O)N(R^5)_2$$

wherein each $R^4$ is independently a divalent hydrocarbyl group containing from 1 to 20 carbon atoms, more often from 1 to about 5 carbon atoms, and each $R^5$ is independently hydrogen or an alkyl or aryl group containing up to about 10 carbon atoms. Thus, the amido group may be an amide group or an ureido group. Generally, each $R^5$ in the formulae for the amido groups is hydrogen or an alkyl group containing from 1 to about 5 carbon atoms.

Examples of silanes useful in the present invention include N-(2-aminoethyl)-3-aminopropyltrimethoxysilane, 3-methacryloxypropyltrimethoxysilane, 3-glycidoxypropyltrimethoxysilane, triacetoxyvinylsilane, tris(2-methoxyethoxy)-vinylsilane, 3-chloropropyltrimethoxysilane, 3-chloropropyltriethoxysilane, N-(aminoethylaminomethyl) phenyltrimethoxysilane, N-(2-aminoethyl)-3-aminopropyl tris(2-ethylhexoxy)silane, 3-aminopropyltrimethoxysilane, trimethoxysilylpropylenetriamine, β(3,4epoxycyclohexyl) ethyltrimethoxysilane,3-mercaptopropyltrimethoxysilane,3-mercaptotriethoxysilane, 3-mercaptopropylmethyidimethoxysilane, bis(2-hydroxyethyl)-3-aminopropyltrimethoxysilane, 1,3-divinyltetramethyidisilazane,vinyltrimethoxysilane, 3-isocyanatopropyidimethylethoxysilane, N-(3-acryloxy-2-hydroxypropyl)-3-aminopropyltriethoxysilane, methyltrimethoxysilane, ethyltrimethoxysilane, phenyltrimethoxysilane, phenyltriacetoxysilane, methyltrimethoxysilane, phenyltrimethoxysilane.

A numberof organofunctional silanes are available, for example, from Union Carbide, Specialty Chemicals Division, Danbury, Conn. Examples of useful silanes available from Union Carbide are summarized in the following table.

TABLE I

Silane Coupling Agents

| Type | Trade Designation | Formula |
|---|---|---|
| Esters | A-137 | $(EtO)_3SiC_8H_{17}$ |
| | A-162 | $(EtO)_3SiCH_3$ |
| Amino | A-1100 | $(EtO)_3Si(CH_2)_3NH_2$ |
| | A-1110 | $(MeO)_3Si(CH_2)_3NH_2$ |
| | A-1120 | $(MeO)_3Si(CH_2)_3NH(CH_2)_2NH_2$ |
| | A-1130 | $(MeO)_3Si(CH_2)_3NH(CH_2)_2NH(CH_2)_2NH_2$ |
| Isocyanato | A-1310 | $(EtO)_3Si(CH_2)_3N{=}C{=}O$ |
| Vinyl | A-151 | $(EtO)_3SiCH{=}CH_2$ |
| | A-171 | $(MeO)_3SiCH{=}CH_2$ |
| | A-172 | $(CH_3OC_2H_4O)_3SiCH{=}CH_2$ |
| Methacryloxy | A-174 | $(MeO)_3Si(CH_2)_3OC(O)C(CH_3){=}CH_2$ |
| Epoxy | A-187 | 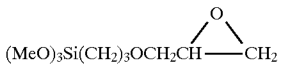 |
| Mercapto | A-189 | $(MeO)_3Si(CH_2)_3SH$ |

The silane is applied to the coated metal surface as aqueous mixture. The concentration of the silane in the mixture may range from about 0.01 to about 2% by weight. In one embodiment where the silane is to be applied and dried without a water rinse, a concentration of about 0.05 to about 0.15 is sufficient. If the sliane treated panel is to be subsequently rinsed with water, silane concentrations of about 0.37 to about 1% or more are used.

In some instances, where chromium does not present an environmental problem, the metal surfaces which have been coated with the aqueous compositions of the present invention can be subsequently rinsed with a hot dilute aqueous solution of chromic acid containing trivalent or hexavalent chromium calculated at $CrO_3$, typically in an amount within the range of from about 0.01 to about 1% by weight of the solution. The chromic acid rinse appears to "seal" the organic first coating and improve its utility as a base for the application of a subsequent siccative organic coating.

Various water-soluble or water-dispersible sources of hexavalent chromium may be used in formulating the rinsing solution, provided the anions and the cations introduced with the hexavalent chromium do not have a detrimental effect on either the solution itself, the coated surfaces treated, or the subsequently applied paint compositions. Exemplary of hexavalent chromium materials which may be used are chromic acid, the alkali metal and ammonium chromates, the alkali metal and ammonium dichromates, the heavy metal chromates, and dichromates such as those of zinc, calcium, chromium, ferric ion, magnesium and aluminum. Chromic acid-phosphoric acid mixtures, mixtures of hexavalent and trivalent chromium, as well as completely trivalent chromium mixtures can also be utilized. Typical chromium rinse solutions can be prepared, for example, by dissolving 38.4 grams of chromic acid and 12.9 grams of hydrated lime in 48.6 grams of water. The working bath is prepared by adding approximately one pint of the solution above to 100 gallons of water.

The chromium rinse solutions can be applied to the coated metal surfaces using various techniques as described above including immersion, flooding, spraying, roller coating, etc. Generally, it is preferred that the aqueous chromium containing rinse solution is maintained at an elevated temperature while it is in contact with the coated metal surface. Temperatures in the range of from about 30° C. to about 80° C. and contact times of up to about 30 seconds or 2 minutes are typical. Following the application of the chromium-containing rinse solutions, the treated metal surfaces preferably may again be rinsed with water so as to remove any of the acidic rinse solution which may remain on the surface.

The metal surface containing the first coating can also be contacted with organic polymer resins to form a second organic coating. Examples of organic polymers which may be deposited over the first coating include urea-formaldehyde resins, polyethyleneamine, polyethanolamine, melamine-formaldehyde resins, etc.

The metal surfaces which have been coated with the aqueous coating compositions of the present invention provide a first coating that can be subsequently contacted with aqueous solutions of inorganic compositions which do not contain chromium such as aqueous solutions containing alkali metal nitrites, alkali metal fluorozirconates, ammonium phosphates, aluminum zirconium metallo-organic complexes, water-soluble organic titanium chelates, etc. Specific examples include aqueous solutions containing sodium nitrite, diammonium phosphate, sodium fluorozirconate, potassium fluorozirconate, mixtures of diammonium phosphate and sodium chlorate, aluminum zirconium complexes comprising the reaction product of a chelated aluminum moiety, an organofunctional ligand and a zirconium oxy halide (as described in, for example, U.S. Pat. No. 4,650,526, the disclosure of which is hereby incorporated by reference), and organic titanium chelates as described in U.S. Pat. No. 4,656,097, the disclosure of which is hereby incorporated by reference. Specific examples of water-soluble organic titanium chelate compounds include TYZOR CLA, TYZOR 131, and TYZOR 101 available from the DuPont Company.

The iron, steel and zinc-coated surfaces which have been provided with a first coating of the aqueous coating compositions of the present invention and, optionally, subsequently contacted with additional solutions described above to form a second coating over the first coating or a seal coat over the first coating exhibit improved corrosion resistance and improved adhesion to siccative organic coatings. Siccative organic coatings which can be applied over the first or second coatings as top-coats include paints, enamels, varnishes, lacquers, synthetic resins, primers, etc. Such top-coats can be applied by conventional means such as by spraying, brushing, dipping, roller coating, or electrophoresis. After application of the siccative top-coat, the treated metal surface is dried either by exposure to the air or by means of a baking technique, depending on the nature of the siccative top-coat material.

The siccative organic coating compositions may be organic solvent based compositions. The organic solvents generally employed in the protective coating industry include benzene, toluene, xylene, mesitylene, ethylene dichloride, trichloroethylene, diisopropyl ether, aromatic petroleum spirits, turpentine, dipentene, amyl acetate, methyl isobutyl ketone, etc.

The siccative organic coating composition may also be a water base or emulsion paint such as synthetic latex paints derived from acrylic resins, polyvinyl alcohol resins, alkyd resins, melamine resins, epoxy resins, phenolic resins, etc., by emulsification thereof with water, as well as water-soluble paints derived from water-soluble alkyd resins, acrylic resins, and the like. The siccative organic coating may be a powder paint.

The siccative organic coating compositions may also contain conventional improving agents such as pigment extenders, anti-skinning agents, driers, gloss agents, color stabilizers, etc.

The siccative organic coating composition may be applied to the coated surface by techniques well known in the art for applying siccative organic coatings such as paints. For example, the coating may be applied by dipping, brushing, spraying, roller-coating, flow-coating, and by the electrophoretic process of painting metal surfaces. Often, the electrophoretic process is preferred because of the improved results which are obtained.

The metallic pigments which may be included in the siccative organic coating compositions may be aluminum, stainless steel, bronze, copper, nickel or zinc powder pigments, and these may be either leafing or non-leafing type. The pigments may be used in the form of fine flakes or foils. Preferably the metallic pigments are such as to deposit a film on the metal articles having a bright metallic appearance. Accordingly, aluminum metal pigments are preferred.

The amount of metallic pigment included in the coating composition can be varied depending on the desired end result with respect to brightness and corrosion resistance. Generally, the resin to pigment weight ratio will vary between about 2.5/1 to 4.5/1 and more preferably from about 3.25/1 to 3.75/1.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. An aqueous metal surface treatment composition comprising:

(A) at least one polyhydroxy functional cyclic compound selected from the group consisting of polyhydroxy phenolic compounds and heterocyclic nitrogen-containing compounds having polyhydroxy functionality;

(B) phosphate ions;

(C) at least one oxidizer-accelerator; and (D) water.

2. The aqueous metal surface treatment composition according to claim 1, further comprising alkali metal ions.

3. The aqueous metal surface treatment composition according to claim 1, further comprising fluoride ions.

4. The aqueous metal surface treatment composition according to claim 1, further comprising ions selected from the group consisting of ferrous ions and ferric ions.

5. The aqueous metal surface treatment composition according to claim 1, wherein the aqueous metal surface treatment has a pH ranging from about 3.5to 5.0.

6. The aqueous metal surface treatment composition according to claim 1, wherein the polyhydroxy functional cyclic compound is a polyhydroxy phenolic compound selected from the group consisting of catechol, methylene-bridged poly(alkylphenols), coumaryl alcohol, coniferyl alcohol, hydroxyalkyl celluloses, lignin, tannic acid and sinapyl alcohol.

7. The aqueous metal surface treatment composition according to claim 1, wherein the polyhydroxy functional cyclic compound is at least one tannin material.

8. The aqueous metal surface treatment composition according to claim 7, wherein the tannin material is selected from the group consisting of vegetable tannin, hydrolyzable tannin, condensable tannin, tannic acid and mixtures thereof.

9. The aqueous metal surface treatment composition according to claim 1, wherein the oxidizer-accelerator is selected from the group consisting of alkali metal chlorate, alkali metal bromate, alkali metal perchlorate, alkali metal chlorite, alkali metal nitrate, alkali metal nitrite, alkali metal perborate, ammonium chlorate, ammonium bromate, ammonium perchlorate, ammonium chlorite, ammonium nitrate, ammonium nitrite, ammonium perborate and mixtures thereof.

10. The aqueous metal surface treatment composition according to claim 1, wherein the oxidizer-accelerator is selected from the group consisting of halo-substituted benzene sulfonic acid, alkali metal salt of halo-substituted benzene sulfonic acid, ammonium salt of halo-substituted benzene sulfonic acid, nitro-substituted benzene sulfonic acid, alkali metal salt of nitro-substituted benzene sulfonic acid and ammonium salt of nitro-substituted benzene sulfonic acid.

11. The aqueous metal surface treatment composition according to claim 1, wherein the oxidizer-accelerator comprises a mixture of an alkali metal salt of meta-nitrobenzene sulfonic acid and at least one alkali metal salt selected from the group consisting of alkali metal chlorate and alkali metal nitrate.

12. The aqueous metal surface treatment composition according to claim 1, wherein the polyhydroxy functional cyclic compound comprises about 0.01% to about 1.5% by weight of the aqueous metal surface treatment.

13. An aqueous metal surface treatment composition comprising:

(A) about 0.01% to about 1.5% by weight of a polyhydroxy functional cyclic compound selected from the group consisting of catechol, methylene-bridged poly (alkylphenols), coumaryl alcohol, coniferyl alcohol, hydroxyalkyl celluloses, lignin, tannin material and sinapyl alcohol;

(B) about 0.01% to about 3% by weight of phosphate ions;

(C) about 0.01% to about 3% by weight of at least one oxidizer-accelerator which is selected from the group consisting of alkali metal chlorates, alkali metal bromates, alkali metal perchlorates, alkali metal chlorites, alkali metal nitrates, alkali metal nitrites, alkali metal perborates and alkali metal salts of meta-nitro benzene sulfonic acid; and (D) water.

14. The aqueous metal surface treatment composition according to claim 13, further comprising about 0.01% to about 1% by weight of fluoride ions.

15. The aqueous metal surface treatment composition according to claim 13, wherein the polyhydroxy functional cyclic compound is lignin.

16. The aqueous metal surface treatment composition according to claim 13, wherein the polyhydroxy functional cyclic compound is a tannin material which is tannic acid.

17. The aqueous metal surface treatment composition according to claim 13, wherein the oxidizer-accelerator comprises a mixture of an alkali metal salt of meta-nitrobenzene sulfonic acid and an alkali metal salt selected from the group consisting of alkali metal chlorate and alkali metal nitrate.

18. The aqueous metal surface treatment composition according to claim 13, further comprising ions selected from the group consisting of ferrous ions and ferric ions.

19. The aqueous metal surface treatment composition according to claim 13, wherein the aqueous metal surface treatment has a pH ranging from about 3.5 to 5.0.

20. The aqueous metal surface treatment composition according to claim 13, wherein the oxidizer-accelerator comprises a mixture of an alkali metal salt of meta-nitrobenzene sulfonic acid and at least one alkali metal salt selected from the group consisting of sodium chlorate and sodium nitrate.

21. The aqueous metal surface treatment composition according to claim 13, wherein the oxidizer-accelerator is selected from the group consisting of sodium molybdate, ammonium molybdate and a combination thereof.

* * * * *